US006947988B1

(12) United States Patent
Saleh

(10) Patent No.: US 6,947,988 B1
(45) Date of Patent: Sep. 20, 2005

(54) METHOD AND APPARATUS FOR ALLOCATING RESOURCES OF A CONTACT CENTER

(75) Inventor: Nayel Saleh, Grayslake, IL (US)

(73) Assignee: Rockwell Electronic Commerce Technologies, LLC, Wood Dale, IL (US)

( * ) Notice: Subject to any disclaimer, the term of this patent is extended or adjusted under 35 U.S.C. 154(b) by 741 days.

(21) Appl. No.: 09/637,969

(22) Filed: Aug. 11, 2000

(51) Int. Cl.[7] .......................................... G06F 15/173
(52) U.S. Cl. ..................... 709/226; 709/223; 709/224; 379/133; 379/265
(58) Field of Search ............................... 709/223, 224, 709/226; 379/133, 265.02, 265

(56) References Cited

U.S. PATENT DOCUMENTS

| | | | | |
|---|---|---|---|---|
| 5,033,004 A | * | 7/1991 | Vandivier, III | 700/103 |
| 5,062,052 A | * | 10/1991 | Sparer et al. | 700/197 |
| 5,224,157 A | * | 6/1993 | Yamada et al. | 379/100.05 |
| 5,299,260 A | * | 3/1994 | Shaio | 379/266.07 |
| 5,329,076 A | * | 7/1994 | Kameli | 187/383 |
| 5,609,770 A | * | 3/1997 | Zimmerman et al. | 210/739 |
| 5,721,770 A | * | 2/1998 | Kohler | 379/265.12 |
| 5,903,641 A | | 5/1999 | Tonisson | 379/266 |
| 5,940,753 A | * | 8/1999 | Mallinckrodt | 455/422.1 |
| 5,978,465 A | | 11/1999 | Corduroy et al. | 379/265 |
| 6,058,163 A | * | 5/2000 | Pattison et al. | 379/265.06 |
| 6,168,563 B1 | * | 1/2001 | Brown | 600/301 |
| 6,330,313 B1 | * | 12/2001 | Hunt | 379/133 |
| 6,363,145 B1 | * | 3/2002 | Shaffer et al. | 379/265.02 |
| 6,477,667 B1 | * | 11/2002 | Levi et al. | 714/57 |
| 6,501,736 B1 | * | 12/2002 | Smolik et al. | 370/252 |
| 6,525,664 B1 | * | 2/2003 | Erland | 340/635 |
| 2001/0056367 A1 | * | 12/2001 | Herbert et al. | 705/11 |

FOREIGN PATENT DOCUMENTS

WO    WO 99/60766    * 11/1999

* cited by examiner

*Primary Examiner*—Nabil M. El-Hady
(74) *Attorney, Agent, or Firm*—Welsh & Katz, Ltd.

(57) ABSTRACT

Resources of a contact center are allocated by electronically monitoring at least one operational parameter of the contact center and performing a comparison between the operational parameter and a threshold value for the operational parameter. An indication of an action to be taken to affect allocation of resources of the contact center is then developed based on the comparison. This allocation also may be performed using an apparatus having a processing unit coupled with a memory, and instructions that are storable in the memory and executable by the processing unit. The instructions could be for monitoring at least one operational parameter of the contact center, performing a comparison between the operational parameter and a threshold value for the operational parameter, and developing an indication of an action to be taken to affect allocation of resources of the contact center.

37 Claims, 3 Drawing Sheets

METHOD AND APPARATUS FOR ALLOCATING RESOURCES OF A CONTACT CENTER

BACKGROUND

The invention relates generally to contact centers and, more particularly, to allocation of resources, such as staff and communication channels, of a contact center.

A contact center (for example, a telephone call center of the type commonly used for telemarketing) typically employs a number of agents who service customers of the contact center using a number of communication channels or transport mechanisms, which may be of a single type or of varying types. Examples of such transport mechanisms include the public switched telephone network (PSTN) and associated telephone trunk lines, the Internet and other packet-transfer connections, cellular telephone systems, satellite communication systems, cable communication systems, etc. Additionally or alternatively, a contact center may employ non-audio transport mechanisms, for example, facsimile or electronic mail transmission. No matter what transport mechanism(s) may be employed by a contact center, the success of a contact center enterprise generally depends upon the efficient allocation of the resources of the contact center, such as contact-center agents and communication channels or transport mechanisms.

Previously, responsibility for maintaining the efficient allocation of resources within a contact center was borne, for the most part, by the administrator of the contact center. For example, in the past, a contact-center administrator would gather and evaluate historical data relevant to earlier operation of the contact center and make decisions as to whether and how to re-allocate contact center resources to improve the efficiency of the contact center. The decision of the contact center administrator then had to be implemented, usually manually, inevitably resulting in a sub-optimal allocation of contact-center resources, as well as resulting in a substantial burden being placed on the contact-center administrator. Further, because the contact center operates substantially continually, any loss of efficiency in contact-center operation would continue, under this prior, manual approach to allocating resources until the contact-center administrator had time to gather and assess the relevant information and implement any necessary re-allocation of resources.

The invention generally relates to a novel method and apparatus for allocating resources of a contact center in a way that alleviates some of the foregoing problems with prior resource allocation techniques. In one embodiment, an "intelligent agent" may be used to monitor one or more operational parameters indicative of contact center performance, compare the monitored operational parameters with corresponding threshold values, and develop, based on the comparison, an indication of an action to be taken to affect the allocation of the resources of the contact center.

In one exemplary embodiment of the invention illustrated herein, resources of a contact center are allocated by a method in which at least one operational parameter of the contact center is electronically monitored, a comparison is performed between the operational parameter and a threshold value for the operational parameter, and an indication of an action to be taken to affect allocation of resources of the contact center is developed based on the comparison. Optionally, these steps may be repeated to provide for continual monitoring of contact-center performance.

The resources of the contact center may comprise, for example, communication lines, trunks, and contact-center agents. Many different operational parameters of a contact center may be monitored. Just a few examples include: service level, time of call occurrence, number of agents assigned to an agent group, number of agents available to service the contact center, and time of a one-time marketing and/or promotional campaign. In some embodiments, the step of electronically monitoring may employ a digital computer associated with the contact center, and the step of performing a comparison may be carried out by the digital computer. By way of example, the threshold value for an operational parameter may be based on a business rule, operational requirement, or strategic initiative of the contact center. Also, the monitoring step may be performed in real-time during contacts in process or may be performed subsequent to termination of one or more contacts based on recorded data relating to the contact(s).

Also, in some embodiments, the indication of an action to be taken may be provided to an administrator of the contact center. Further, the action to be taken may include, for example, transferring an agent from a first agent group of the contact center (such as an agent group with excess capacity, for example) to a second agent group of the contact center (such as an agent group operating at a service level below a desired threshold service level).

Some embodiments of the method of the present invention also may include the steps of acquiring at least one parameter to be monitored, acquiring a threshold value for the monitored parameter(s), and acquiring an action to be taken based on the comparison.

The invention also may be embodied in an apparatus for allocating resources of a contact center. Some embodiments of such an apparatus may include a processing unit coupled with a storage device wherein a first set of instructions is storable in the storage device and executable by the processing unit for monitoring at least one operational parameter of the contact center. A second set of instructions, storable in the storage device and executable by the processing unit, provides for performing a comparison between the operational parameter and a threshold value for the operational parameter. A third set of instructions, storable in the storage device and executable by the processing unit, provides for developing, based on the comparison, an indication of an action to be taken to affect allocation of resources of the contact center.

DETAILED DESCRIPTION

Figure 1:
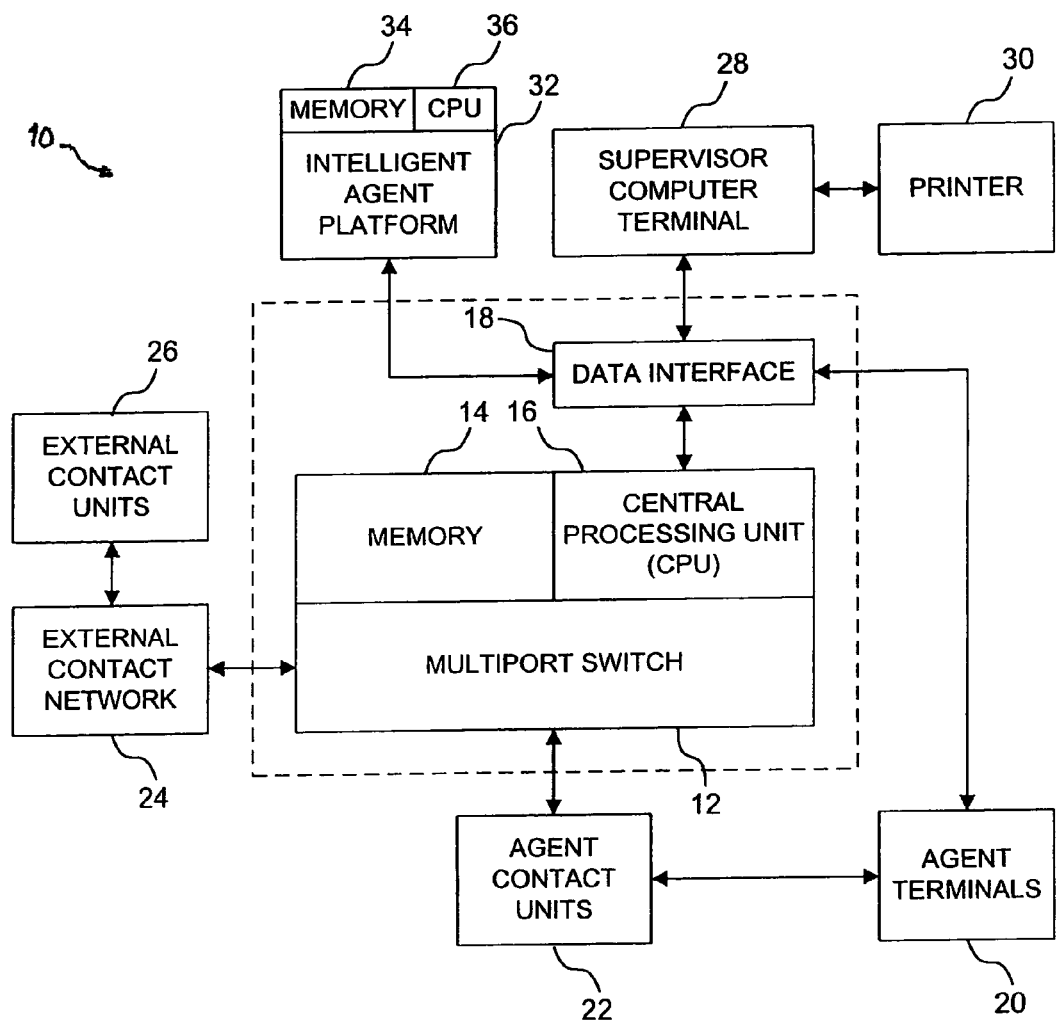
FIG. 1 is a block diagram of an exemplary embodiment of a contact center environment in which the method and apparatus of the invention may advantageously be used.

FIG. 1 illustrates, in block-diagram form, an exemplary embodiment of a contact center 10 in connection with which the resource allocation method and apparatus of the present invention may be used. As shown in FIG. 1, the contact center 10 includes a multiport switch 12, which has an associated memory 14, a central processing unit (CPU) 16, and a data interface 18 coupled for bi-directional communication with the CPU 16 (as indicated by the bi-directional arrow shown interconnecting the CPU 16 and the data interface 18 in FIG. 1). The multiport switch 12 may be a telephony switch, such as an automatic call distributor (ACD), for example, an e-mail switch, a multi-media switch, or any other type of dedicated or hybrid data processing system. One or more agent terminals 20 also communicate bidirectionally with the multiport switch 12 via the data interface 18 and also with one or more agent contact units 22. Bi-directional communication is also provided between the agent contact unit(s) 22 and the multiport switch 12. Similarly, an external contact network 24 communicates bidirectionally with the multiport switch 12, and a plurality of external contact units 26, in turn, communicate bidirectionally with the external contact network 24.

A contact-center agent employed by the enterprise operating the contact center 10 is assigned to each agent terminal 20 and an associated agent contact unit 22. The assigned contact-center agent uses the agent terminal 20 and agent contact unit 22 to interact with customers on external contact units 26 via the multiport switch 12. A supervisor computer 28 is bidirectionally coupled to the data interface 18 so that a contact-center administrator or supervisor of the contact-center agents can receive data from the multiport switch 12 in order to oversee and monitor the performance of the contact-center agents during agent-customer interaction, and so that the contact center administrator or supervisor can attend to administrative functions of the contact center 10. An optional printer 30 is coupled to the supervisor computer terminal 28 to enable a contact-center supervisor or administrator to generate hardcopy reports relating to contact-center operation, for example.

An exemplary embodiment of an intelligent agent platform 32 (such as a stand-alone microcomputer, for example having a memory 34 and a CPU 36 associated therewith) may also be bidirectionally coupled with the data interface 18 so that it can exchange data and control information with the CPU 16 of the multiport switch 12. Of course, the intelligent agent platform 32 may be embodied in any suitable computer hardware, software, or firmware in addition to, or instead of, a stand-alone microcomputer.

Figure 2:
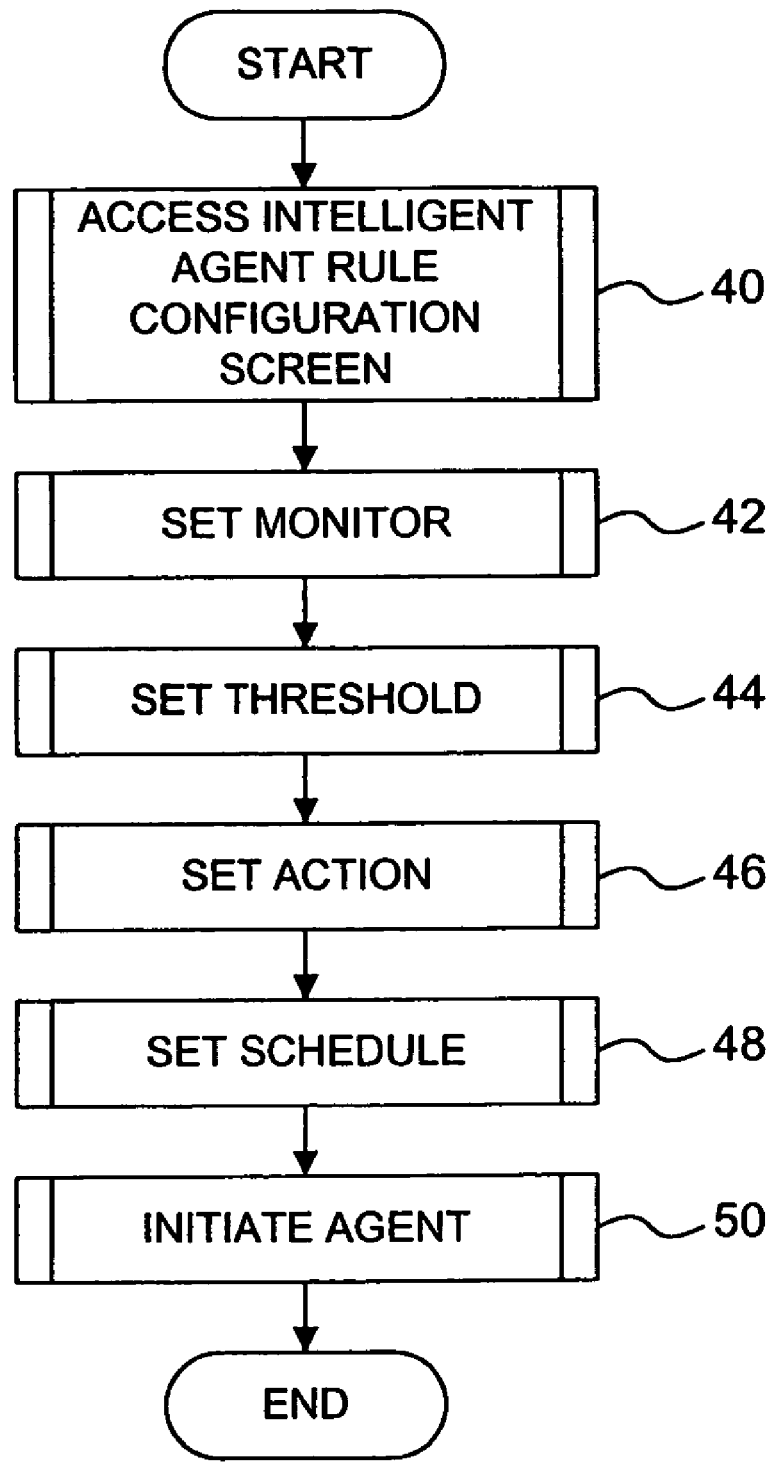
FIG. 2 is a flowchart illustrating one exemplary embodiment of programming for configuring an intelligent agent in accordance with the principles of the present invention.
Figure 3:
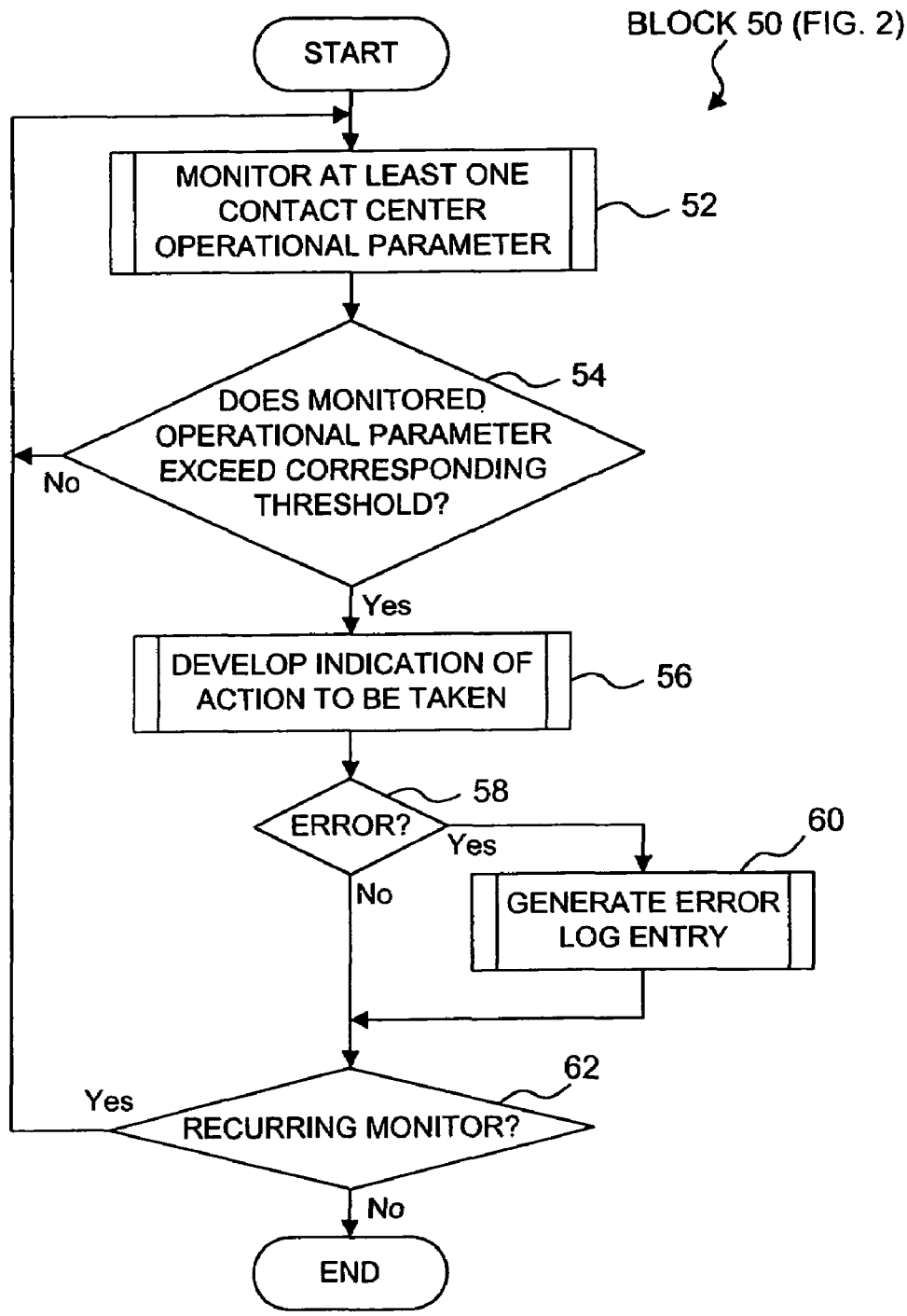
FIG. 3 is a flowchart illustrating one exemplary embodiment of programming for implementation of the method and apparatus of the present invention.

FIGS. 2 and 3, respectively, depict high level flowcharts illustrating one exemplary embodiment of programming associated with the configuration (FIG. 2) and the operation (FIG. 3) of one exemplary embodiment of the intelligent agent. It should be understood that functionality described herein of the various blocks or routines of the flowcharts of FIGS. 2 and 3 may be implemented in many ways, using any desired programming language or program design techniques, including, for example, sequential, procedural, or object-oriented programming or any combination thereof. Particular instructions, subroutines, or subprograms used to implement such functionality are known to those of ordinary skill in the art.

As shown in the example flow chart of FIG. 2, a routine 40 permits a user (e.g. a contact-center administrator or supervisor) to access an intelligent-agent rule-configuration screen, such as by double-clicking an intelligent-agent icon in a window-based operating system or other graphical user interface, for example. The rule-configuration screen comprises a software interface which enables the user to configure various aspects of the intelligent agent, including the monitors, thresholds, actions to be taken, and monitoring schedule, as described in detail below.

First, a routine 42 permits the user to set a monitoring function to be performed by the intelligent agent within the contact center 10. More particularly, the routine 42 can provide the user with an interface with which to specify what parameter or parameters will be monitored by the intelligent agent. For example, the user can be presented with a drop-down menu or list of the various parameters that can be monitored. The intelligent agent can observe or track a parameter or statistic that is derived or calculated, whether by the intelligent agent platform 32 or by the CPU 16 of the multiport switch 12, as shown in FIG. 1. The intelligent agent can also track an absolute measurement (e.g. time of day or number of calls received) or a predetermined point in time. Virtually any desirable parameter known to be of interest to those skilled in the art may be monitored. The particular parameters that may be available for monitoring will, of course depend upon the functional capabilities of the multiport switch 12 and the business objectives or strategic initiatives of the contact center 10. Just a few examples of such parameters are presented herein as exemplary illustrations.

The "service-level" of an agent group of the contact center 10, for example, can be monitored to ensure that customers of the contact center 10 are not waiting on-hold (in the telephony context) or are not left waiting for a reply message (in the e-mail context) for an unacceptably long period of time. The service level of a telephony agent group may be represented, for example, as a percentage of contacts processed by the agent group that do not involve a customer waiting on-hold at all, or do not involve a hold-time exceeding a predetermined maximum acceptable hold-time. For an e-mail agent group, service level may be represented as a percentage of e-mail contacts to which a reply is sent within a predetermined maximum acceptable response-time.

The intelligent agent also can be instructed to monitor a time limit, such as for moving contact-center agents from one agent group to another in anticipation of a one-time marketing or promotional campaign, for example, or to monitor for a particular time period during which a particular agent group may generally experience elevated or reduced contact levels. Many other clock-based parameters can also be monitored by an intelligent agent in accordance with the principles of the present invention.

Other examples of parameters that the intelligent agent can monitor include the times when contacts occur, the number of agents assigned to a particular agent group, and the number of agents available to service the contact center (taking account of agents who are unavailable due to illness, vacation, etc.).

As shown in FIG. 2, a routine 44 permits the user to select a threshold or limit value for the parameter or monitor selected via the routine 42. Once again, a menu-driven graphical interface can be provided by the routine 44, wherein the user is able to access a list of available threshold values corresponding to the selected parameter or monitor using a drop-down list-box or other suitable software control. For example, if a clock-based parameter is selected via the routine 42, the routine 44 may permit the user to specify or choose time and/or date threshold values. Likewise, if service level is the selected parameter, the routine 44 may permit the user to select a percentage threshold value within an appropriate range. For example, a service level of 100% might be unacceptably high because it would entail having agents sitting idle waiting for contacts from contact-center customers, whereas a service level of 50% would entail fully half of the customers of the contact center having to wait for service by contact-center agents. Thus, the appropriate range for the service-level threshold value in one exemplary embodiment could be, for example, 80%–90%. The routine 44 may also prompt the user to supply or select a comparative operator, such as less-than, less-than-or-equal-to, greater-than, or greater-than-or-equal-to, for example, to be used in performing a comparison between the selected monitor or parameter and the selected threshold value for the selected monitor or parameter. In other words, the intelligent agent can be configured to take a chosen action when the value of the selected monitor or parameter exceeds, or falls below, the selected threshold value, depending on which comparative operator is selected via the routine 44. The combination of the selected threshold value and the selected comparative operator is referred to herein as the "condition" or "comparison" performed by the intelligent agent in any particular instance.

Next, a routine 46 permits the user to select an action to be taken when the intelligent agent determines that the parameter selected via the routine 42 meets the condition selected via the routine 44. Here, too, the user may be presented with a finite list of choices or may be permitted to build a composite action sequence from predetermined or user-specified call-center functions. By way of example, where the intelligent agent is configured to monitor the service-level of a particular agent group with respect to a selected minimum acceptable threshold value, the action to be taken might be to move an agent from an agent group with excess agent capacity to the agent group having a service level that has been found to have fallen below the minimum acceptable service-level threshold value.

A routine 48 then permits the user to select a monitoring schedule for the intelligent agent, again using any suitable graphical or other interface. For example, a monitoring function may relate to a one-time occurrence, such as a special marketing or promotional campaign for which a particular agent group might require a large number of agents for a period of time, or an ongoing requirement, such as maintaining an acceptable service-level for an agent group in accordance with operational requirements, business rules, or strategic initiatives of the contact center 10 (FIG. 1). In particular, the routine 48 may prompt the user to select whether the monitor selected via the routines 42, 44, and 46 is to be performed once or whether it is to be performed recurrently until the selected condition is met. For recurrent monitoring, the user may be further prompted to select or provide a time- and/or date-limit when the recurrent monitoring is to terminate, a frequency at which the monitoring is to be performed, and/or an absolute number of times the monitoring is to be performed.

Once the intelligent agent is configured via the routines 42, 44, 46, and 48, the user may initiate operation of the intelligent agent via a routine 50, which may provide, for example, a "start" button or other suitable mechanism through which the user can transfer program control to the programming associated with the flowchart of FIG. 3.

FIG. 3 is a flow chart illustrating an example of a routine 52 which performs the monitoring of at least one specified operational parameter of the contact center 10 (e.g., as specified via the routine 42 as described above). This monitoring may be performed, for example, with respect to a value for the specified parameter that is calculated or derived by the intelligent agent within the intelligent agent platform 32, by the CPU 16 of the multiport switch 12, by the multiport switch 12 itself, or by a value that is extracted from a data stream that the intelligent agent platform 32 receives from the CPU 16 of the multiport switch 12 via the data interface 18, as shown in FIG. 1.

As shown in FIG. 3, comparison is then performed by the block 54 between the specified operational parameter(s) and the specified corresponding threshold values to determine whether the specified conditions are met. If none of the conditions being monitored is met, control simply returns to the routine 52 to continue monitoring until the condition is met. If any of the conditions being monitored is met, control passes to a routine 56 described below. For one-time monitoring, the conditions being monitored typically will include a time-based condition (i.e., a time limit), such that the monitoring will not continue indefinitely but rather will terminate (with respect to that particular monitor) when the time-based condition is met.

The routine 56 develops, based on the result of the comparison performed by the block 54, an indication of an action to be taken. The indication is based on whatever action was selected via the routine 46 as described above in connection with FIG. 2. The indication may include actually performing all or a portion of the specified action, where the action can be fully or partially automated, or may simply comprise, for example, a notification that is provided to the user or another administrator, supervisor, or agent of the contact-center 10 of what action is to be taken. Optionally, the reason why the action is required (i.e., the condition that was determined to have been met) can also be made a part of the indication of the action to be taken. By way of example, actions that may be taken or indicated may include, among others, moving one or more agents from one agent group to another, shutting down a call trunk or, more generally, a contact transport mechanism, shutting down the entire contact center 10 (e.g., for holidays), etc.

A block 58, as shown in FIG. 3, then determines whether an error condition exists as a result of the indication developed by the routine 56. An error condition is generated, for example, if any portion of the specified action was supposed to be taken and was not taken. For example, if the action to be taken necessitates moving a contact-center agent from a first agent group to a second agent group, an error condition will occur if the first agent group does not have at least one qualified agent available that can be moved to fill this need. In the event that the block 58 determines that an error condition does exist, a routine 60 generates an entry in an error log maintained by the intelligent agent platform 32 (FIG. 1), and control then passes to a block 62. Of course, other available, relevant information (e.g., date, time, reasons, agent group(s) or contact channel(s) affected, etc.) may also be included in the error log in addition to a description of the error itself. If the block 58 determines that no error condition exists, the routine 60 is bypassed, and control passes directly to the block 62. The block 62 determines whether the monitoring is scheduled to occur one time or recurrently (as described above with reference to the routine 48 of FIG. 2). If the monitor was scheduled to occur recurrently, control returns to the routine 52 to repeat the process of monitoring, performing the required comparison, and developing an indication of an action to be taken until the specified condition occurs. Otherwise, operation of the intelligent agent ends for the now-completed monitor(s). Or course, any number of monitors may be initiated concurrently, and when one monitor is completed, other monitors may continue to be performed on the intelligent agent platform 32.

The foregoing description is for the purpose of teaching those skilled in the art and is to be construed as illustrative only. Numerous modifications and alternative embodiments of the invention will be apparent to those skilled in the art in view of this description, and the details of the disclosed structure may be varied substantially without departing from the spirit of the invention. Accordingly, the exclusive use of all modifications within the scope of the appended claims is reserved.

What is claimed is:

1. A method of allocating resources of a contact center using an intelligent agent comprising the steps of:
   providing an intelligent-agent rule-configuration screen on a supervisor's terminal that allows the supervisor to select at least one parameter from a displayed list of a plurality of operational parameters, to set a threshold or limit for the at least one parameter from a displayed list of threshold values and limits for the at least one parameter, to select an action to be taken from a displayed list of actions, to select a monitoring schedule from a displayed list of monitoring schedules, and to initiate the intelligent agent from a display;
   selecting at least one operational parameter of the plurality of operational parameters through the intelligent agent rule-configuration screen on the supervisor's terminal;
   selecting a monitoring schedule through the intelligent-agent rule configuration-screen on the supervisor's terminal that determines how the selected at least one operational parameter will be monitored;
   electronically monitoring the selected at least one operational parameter of the contact center based upon the selected monitoring schedule;
   performing a comparison between the operational parameter and a threshold value for the operational parameter; and
   determining, based on the comparison, whether an action to be taken to affect allocation of resources of the contact center is necessary.

2. The method of claim 1, further comprising taking an action, the action to be taken is at least one of shutting down a call trunk, shutting down a communication line, and shutting down all of or part of the call center.

3. The method of claim 1, wherein at least one operational parameter is selected from a group including service level, time of call occurrence, number of agents assigned to an agent group, number of agents available to service the contact center, and time of a one-time marketing/promotional campaign.

4. The method of claim 1, wherein the step of electronically monitoring, and the step of performing a comparison employ a digital computer associated with the contact center.

5. The method of claim 1, wherein the monitoring step is performed in real-time.

6. The method of claim 1, wherein the action to be taken tends to improve the value of the operational parameter with respect to the threshold value.

7. The method of claim 1, wherein the monitoring step comprises the step of obtaining a sample value of the operational parameter.

8. The method of claim 1, wherein the monitoring schedule is at least one of a one time occurrence, a recurrent monitoring with a time or date limit, a recurrent monitoring to be preformed until a certain condition is met, a frequency at which the monitoring is to be performed, and an absolute number of times at which the monitoring is to be performed.

9. The method of claim 8, further comprising the step of acquiring a limitation to terminate the repeated performance of steps, and the step of terminating the repeated performance of steps in accordance with the acquired limitation.

10. The method of claim 1, further comprising the step of determining whether an error condition exists.

11. The method of claim 10, further comprising the step of indicating that an error condition exists.

12. The method of claim 1, further comprising the step of acquiring a threshold value for at least one parameter, and the step of acquiring an action to be taken.

13. The method of claim 1, further comprising the step of providing indication of an action to be taken.

14. The method of claim 13, further comprising the step of determining whether an error condition exists, and the step of indicating whether an error condition exists.

15. The method of claim 14, wherein the monitoring, performing a comparison, determining an action, providing indication of an action, determining whether an error condition exists, and indicating whether an error condition exists steps are performed repeatedly.

16. The method of claim 15, further comprising the step of acquiring a limitation to terminate the repeated performance of steps.

17. The method of claim 16, further comprising the step of terminating the repeated performance of steps in accordance with the acquired limitation.

18. An apparatus for allocating resources of a contact center using an intelligent agent, comprising:
   a supervisors terminal;
   an intelligent-agent rule configuration screen on the supervisors terminal adapted to select at least one operational parameter from a displayed list of a plurality of operational parameters, to set a limit or threshold for the at least one parameter from a displayed list of threshold values and limits for the at least one parameter, to select an action to be taken from a displayed list of actions, to select a monitoring schedule from a displayed list of monitoring schedules that determine how the at least one parameter is to be monitored, and to initiate the intelligent agent from a display;
   a processing unit coupled with a storage device;
   a first set of instructions storable in the storage device and executable by the processing unit for monitoring the selected at least one operational parameter of the contact center based upon the selected operational parameter and the selected monitoring schedule;
   a second set of instructions storable in the storage device and executable by the processing unit for performing a comparison between the operational parameter and a threshold value for the operational parameter; and
   a third set of instructions storable in the storage device and executable by the processing unit for determining whether an action to be taken to affect allocation of resources of the contact center is necessary.

19. The apparatus of claim 18, further comprising a fourth set of instructions in the storage device and executable by the processing unit for taking an action wherein the action to be taken is at least one of shutting down a call trunk, shutting down a communication line, and shutting down all or part of the call center.

20. The apparatus of claim 18, wherein the operational parameter is selected from a group including service level, time of call occurrence, number of agents assigned to an agent group, number of agents available to service the contact center, and time of a one-time marketing/promotional campaign.

21. The apparatus of claim 18, wherein the first set of instructions provides for monitoring the operational parameter in real-time.

22. The apparatus of claim 18, wherein the action to be taken tends to improve the value of the operational parameter with respect to the threshold value.

23. The apparatus of claim 18, wherein the first set of instructions comprises instructions for obtaining a sample value of the operational parameter.

24. The apparatus of claim 18, wherein the first, second, and third sets of instructions are executed repeatedly.

25. The apparatus of claim 18, further comprising a set of instructions storable in the storage and executable by the processing unit for determining whether an error condition exists.

26. The apparatus of claim 25, further comprising a set of instructions storable in the storage and executable by the processing unit for indicating that an error condition exists.

27. The apparatus of claim 18, further comprising sets of instructions storable in the storage and executable by the processing unit for acquiring a threshold value for at least one parameter, for acquiring at least one parameter to be monitored, and for acquiring an action to be taken.

28. The apparatus of claim 18, further comprising a set of instructions storable in the storage and executable by the processing unit for providing indication of an action to be taken.

29. The apparatus of claim 28, further comprising sets of instructions storable in the storage and executable by the processing unit for determining whether an error condition exists, and for indicating whether an error condition exists.

30. The apparatus of claim 29, wherein the first, second, third, providing indication of an action to be taken, determining whether an error condition exists, and indicating whether an error condition exists instructions are executed repeatedly.

31. The apparatus of claim 30, further comprising sets of instructions storable in the storage and executable by the processing unit for acquiring a limitation to terminate the repeated performance of steps, and for terminating the repeated performance of steps in accordance with the acquired limitation.

32. An apparatus for allocating resources of a contact center using an intelligent agent, comprising:

means for providing an intelligent-agent rule-configuration screen on a supervisors terminal that allows the supervisor to select at least one parameter from a displayed list of a plurality of operational parameters, to set a threshold or limit for the at least one parameter from a displayed list of threshold values and limits for the selected at least one parameter, to select an action to be taken from a displayed list of actions, to select a monitoring schedule from a displayed list of monitoring schedules, and to initiate the intelligent agent from a display;

means for selecting at least one operational parameter of a plurality of operational parameters;

means for selecting a monitoring schedule, the monitoring schedule to determine how the at least one parameter is to be monitored;

means for monitoring the selected at least one operational parameter of the contact center;

means for performing a comparison between the operational parameter and a threshold value for the operational parameter; and means for determining whether an action to be taken to affect allocation of resources of the contact center is necessary.

33. The apparatus of claim 32, wherein the monitoring means provides for monitoring the operational parameter in real-time.

34. The apparatus of claim 32, wherein the monitoring schedule is at least one of a one time occurrence, a recurrent monitoring with a time or date limit, a recurrent monitoring to be preformed until a certain condition is met, a frequency at which the monitoring is to be performed, and an absolute number of times at which the monitoring is to be performed.

35. The apparatus of claim 32, further comprising means for acquiring a threshold value for at least one parameter, means for acquiring at least one parameter to be monitored, and means for acquiring an action to be taken based on the comparison.

36. The apparatus of claim 32, wherein the monitoring means comprises instructions for obtaining a sample value of the operational parameter.

37. The apparatus of claim 32, further comprising means for determining whether an error condition exists, and means for indicating whether an error condition exists.

* * * * *